(12) United States Patent
Huang

(10) Patent No.: US 7,706,374 B2
(45) Date of Patent: Apr. 27, 2010

(54) METHOD FOR ASSIGNING IP ADDRESS TO TERMINAL DEVICE AND COMMUNICATION SYSTEM

(75) Inventor: Yong Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 544 days.

(21) Appl. No.: 11/643,414

(22) Filed: Dec. 21, 2006

(65) Prior Publication Data

US 2007/0160051 A1    Jul. 12, 2007

(30) Foreign Application Priority Data

Jan. 6, 2006    (CN) .................. 2006 1 0032686

(51) Int. Cl.
*H04L 12/28* (2006.01)
(52) U.S. Cl. ........................................ 370/392
(58) Field of Classification Search ......... 370/392, 370/389; 709/238, 245
See application file for complete search history.

(56) References Cited

U.S. PATENT DOCUMENTS

| | | | |
|---|---|---|---|
| 7,095,738 B1 * | 8/2006 | Desanti | 370/389 |
| 7,283,517 B2 * | 10/2007 | Yan et al. | 370/352 |
| 2002/0112076 A1 * | 8/2002 | Rueda et al. | 709/245 |
| 2004/0017816 A1 * | 1/2004 | Ishwar et al. | 370/395.53 |
| 2004/0064559 A1 * | 4/2004 | Kupst et al. | 709/226 |
| 2004/0205235 A1 * | 10/2004 | Matsuhira | 709/238 |
| 2005/0243818 A1 * | 11/2005 | Foglar et al. | 370/389 |

* cited by examiner

*Primary Examiner*—Ayaz R Sheikh
*Assistant Examiner*—Hai-Chang Hsiung
(74) *Attorney, Agent, or Firm*—Finnegan, Henderson, Farabow, Garrett & Dunner LLP

(57) ABSTRACT

A method for assigning an IP address to a terminal device and a communication system. The method includes: a router transmitting to a layer-2 device network a Router Advertisement message carrying routing prefix information; the layer-2 device network generating extended routing prefix information which identifies the downlink port uniquely within the broadcast domain of the subnet where the layer-2 device network is located according to the routing prefix information in the Router Advertisement message, and transmitting to the terminal device a Router Advertisement message carrying the extended routing prefix information; and the terminal device generating its IP address according to the extended routing prefix information in the Router Advertisement message and an Interface ID of the terminal device. Accordingly, it is unnecessary for the terminal device to perform address uniqueness check across the layer-2 devices in the network to ensure uniqueness of the IP address of the terminal device, thus improving the operating performance of the network.

15 Claims, 2 Drawing Sheets

---

Router transmits to layer-2 device network connected therewith Router Advertisement message which carries routing prefix information — 11

Layer-2 device network receives Router Advertisement message, generates extended routing prefix information, and transmits to terminal device Router Advertisement message carrying extended routing prefix information — 12

Terminal device generates IP address according to extended routing prefix information in received Router Advertisement message and Interface ID of terminal device — 13

| n bits | m bits | (128-n-m) bits |
|---|---|---|
| Global Routing Prefix | Subnet ID | Interface ID |

METHOD FOR ASSIGNING IP ADDRESS TO TERMINAL DEVICE AND COMMUNICATION SYSTEM

FIELD OF THE INVENTION

The present invention relates to the field of data communication, and particularly to a method for assigning an IP address to a terminal device and a communication system.

BACKGROUND OF THE INVENTION

IPv6 stands for "Internet Protocol Version 6", also referred to as the next generation of Internet Protocol, which is a new IP protocol developed by the Internet Engineering Task Force (IETF) to take the place of current IPv4. IPv6 is proposed for addressing the problems and deficiencies with IPv4 and has brought out improvements in various aspects such as routing, autoconfiguration and the like. IPv6 will completely take the dominant place of IPv4 in the Internet after a relatively long period of their coexistence. IPv6 has the following characters in comparison with IPv4: a simplified head; flexible extension; a hierarchical address structure; a plug-and-play networking approach; authentication and encryption at the network layer; fulfillment of Quality of Service; and a better support for mobile communications.

IPv6 extends the length of a current IP address by a factor of 4, i.e., the length of 32 bits for current IPv4 is extended to 128 bits, so as to support a large number of network nodes. Thus, the total number of the IPv6 addresses is about $3.4 \times 10^{38}$. If it were averaged over the surface of the earth, there would be $6.5 \times 10^{23}$ addresses per square meter. IPv6 supports more levels of address hierarchy in that its address space is designed to be divided as per different address prefixes, and the hierarchical address structure is used to facilitate rapid forwarding of data packages by a router in a backbone network.

A global IPv6 address is composed of a global routing prefix, a subnet identifier and an interface identifier. As defined in Section 2.5.4 of RFC3513 and shown in FIG. 1, a global routing prefix is a value indicative of a typical hierarchical structure assigned to a site (a group of subnets or links), a subnet ID identifies a subnet within a site, and an interface ID identifies an interface on a link.

The Internet Assigned Number Authority (IANA) governs a consolidated assignment of global routing prefixes. An organization provided with a global routing prefix is responsible for the assignment of subnet IDs, in a similar way to the assignment of subnet masks in an IPv4 context, for which there is no related standard and which, at present, is usually achieved through manual management and configurations. The assignment of interface IDs can be realized through state and stateless autoconfiguration, where the state autoconfiguration can change the IP addresses of all hosts within the network without manual intervention and hence has been applied more widely.

RFC2462 describes a stateless autoconfiguration procedure for the assignment of an IP address to an IPv6 terminal device. The stateless autoconfiguration requires a support for multicast by a local link and the abilities of a network interface to transmit and receive a multicast message. This procedure requires a host within the network to perform the following steps.

First, the host for autoconfiguration determines a local link address of its own.

Then, the uniqueness of the local link address of the host is checked within the broadcast domain of the subnet.

Finally, the host determines information required for the configuration, for example, including an IP address of a node and/or other configuration information.

Specifically, during the stateless autoconfiguration, the host first generates a local link address through appending the MAC address of its network card after the prefix, 1111111010, of the local link address, and particularly in the case of a 48-bit MAC address of the network card used by the host, the IPv6 driver of the network card can convert the 48-bit MAC address into a 64-bit MAC address according to a certain formula. Then, the host transmits to this address a multicast message of Neighbor Discovery Request (NDR) for the check of the uniqueness of the address. If there is no response to the request, it indicates that the local link address configured by the host itself is of uniqueness; otherwise it indicates that there is an address on the link identical to the local link address configured by the host itself. In the latter case, the host can use an interface ID generated randomly to compose a new local link address, and then with this address being as a source address, multicasts to all the routers on the local link a Router Solicitation (RS) to request configuration information, and the routers respond with a Router Advertisement (RA) containing a global address prefix and other relevant configuration information. The host configures a global address automatically by adding its own interface ID to the global address prefix obtained from the routers, and then gets the ability to communicate with another host within the Internet.

Stateless autoconfiguration in the prior art provides an IP address configuration method that is well suitable for an IP network interconnected through routers. However, the uniqueness check of a local link address in the stateless autoconfiguration requires a support for multicast by the local link and a broadcast feature of the network forming the local link. In the context of a network where routers are connected with terminal devices through a Non Broadcast Multi Access (NBMA) layer-2 network, including, for example, a frame delay network, an asynchronous transfer mode network and the like, however, the terminal devices can not conduct the address uniqueness check by means of the broadcast characteristics of the link during address configuration, and hence the stateless autoconfiguration of addresses is impossible.

Moreover, in the case that a layer-2 device at a convergence location implements Neighbor Discovery and communication with a host within a subnet through an agent, the layer-2 device has to implement broadcast even if there is no link-layer address corresponding to the requested IP address. At this point, the broadcast would be impossible when a router and a terminal device are connected through an NBMA layer-2 device, and a broadcast message thus generated may affect the network performance to some extent.

SUMMARY OF THE INVENTION

In view of the above, embodiments of the present invention provide a method for assigning an IP address to a terminal device connected to a router through a layer-2 network, which can ensure uniqueness of the addresses corresponding to different ports of a layer-2 device without address uniqueness check among the different ports, and also reduce the traffic resulted from multicast messages within a subnet and improve the performance of the network.

An embodiment of the present invention provides a method for assigning an IP address to at least one terminal device connecting to a router through a lay-2 device network, including the steps of:

a) transmitting, by the router, to the layer-2 device network a Router Advertisement message carrying routing prefix information;

b) receiving, by the layer-2 device network, the Router Advertisement message, generating for each downlink port an extended routing prefix which identifies the port uniquely within the broadcast domain of the subnet where the layer-2 device network is located according to the routing prefix information in the received Router Advertisement message, and transmitting to the terminal device a Router Advertisement message carrying the extended routing prefix information via the port corresponding to the terminal device; and c) generating, by the terminal device, an IP address of the terminal device according to the extended routing prefix information in the received Router Advertisement message and an interface ID of the terminal device.

Another embodiment of the present invention provides a communication system, including a router, a layer 2 device network, and at least one terminal device connected to the router through the layer-2 device network, wherein:

the router is configured to transmit to the layer-2 device network a Router Advertisement message carrying routing prefix information;

the layer-2 device network is configured to receive the Router Advertisement message, generate for each downlink port an extended routing prefix which identifies the port uniquely within the broadcast domain of the subnet where the layer-2 device network is located according to the routing prefix information in the received Router Advertisement message, and transmit to the terminal device a Router Advertisement message carrying the extended routing prefix information via the port corresponding to the terminal device; and the terminal device is configured to generate an IP address of the terminal device according to the extended routing prefix information in the received Router Advertisement message and an interface ID of the terminal device.

Another embodiment of the present invention provides a layer-2 device network connecting a router and at least one terminal device, including at least one layer-2 device configured to receive a Router Advertisement message transmitted from the router, generate for each downlink port an extended routing prefix which identifies the port uniquely within the broadcast domain of the subnet where the layer-2 device network is located according to the routing prefix information in the received Router Advertisement message, and transmit to the terminal device a Router Advertisement message carrying the extended routing prefix information via the port corresponding to the terminal device, such that the terminal device is able to generate an IP address of the terminal device according to the extended routing prefix information in the received Router Advertisement message and an interface ID of the terminal device.

BRIEF DESCRIPTIONS OF THE DRAWINGS

DETAILED DESCRIPTIONS OF THE EMBODIMENTS

Preferred embodiments of the present invention will be described in detail below with reference to the drawings.

Figures 1, 2:
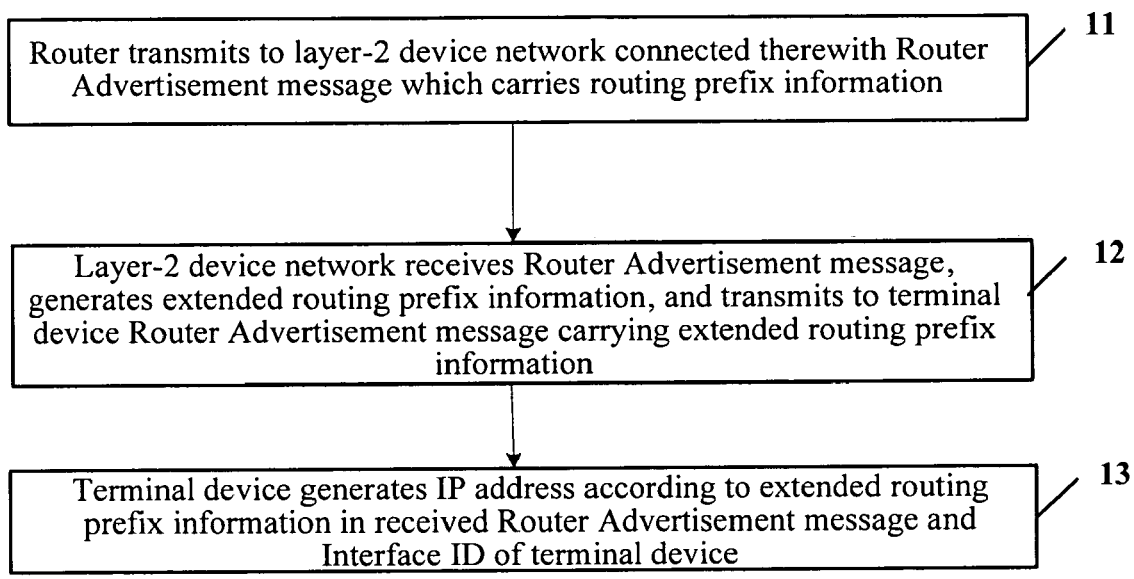
FIG. 1 illustrates a global IPv6 unicast address structure in the prior art.
FIG. 2 is a schematic diagram illustrating the principle of assignment of an IP address to a terminal device attached to a router according to an embodiment of the present invention.

Referring to FIG. 2, a method for assigning an IP address of at least one terminal device mainly includes the following steps.

In step 11, a router transmits to a layer-2 device network connected therewith a Router Advertisement message which carries routing prefix information.

In step 12, the layer-2 device network receives the Router Advertisement message, and according to the routing prefix information contained in the received Router Advertisement message, generates for each downlink port an extended routing prefix which can identify that port uniquely within the broadcast domain of the subnet where the layer-2 device network is located, and transmits via the port corresponding to the terminal device to the terminal device connected therewith a Router Advertisement message which carries the extended routing prefix information. Specifically, the layer-2 device network includes at least one layer-2 device connecting the router and the terminal devices, and by the same method for extending a routing prefix, each layer-2 device within the layer-2 device network can generate an extended routing prefix which can uniquely identify the downlink port of that layer-2 device.

In step 13, the terminal device generates its IP address according to the extended routing prefix information in the received Router Advertisement message and an interface ID of the terminal device.

The method will be further described by way of example hereinafter.

Figure 3:
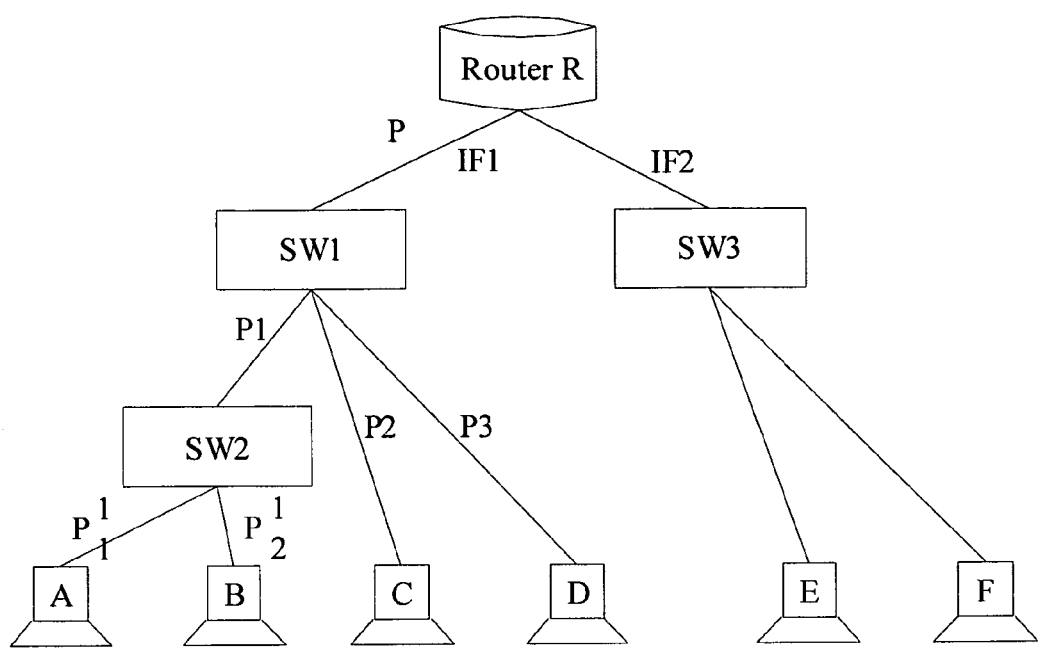
FIG. 3 is a schematic diagram of a network used for illustrating an IP address prefix assignment according to an embodiment of the present invention.

Referring to FIG. 3, a router R is provided with two interfaces, a first interface IF1 and a second interface IF2. Two layer-2 devices SW1 and SW2 are cascade-connected to the first interface IF1. Two hosts C and D are further attached to the layer-2 device SW1, and two hosts A and B are further attached to the layer-2 device SW2. A layer-2 device SW3 is attached to the second interface IF2, and two hosts E and F are further attached to the layer-2 device SW3. The devices and hosts attached to the first and second interfaces IF1 and IF2 form two subnets respectively.

Here, the layer-2 device refers to a device which connects the terminal device and the router and mainly performs functions of access and convergence but does not operate a routing protocol. The layer-2 device is not provided with an interface of the network layer for routing and interconnection as in a router, but has some abilities to percept and process IP layer information used for communicating with the local terminal devices.

For a clearer description of the embodiments of the present invention, some symbols are introduced here as follows.

P/n is representative of a prefix, with a length of n (n is a positive integer), in an IPv6 address, also referred to as "prefix P".

P1/n+m1 is representative of a prefix, with a length of n+m1 (n and m1 are positive integers), in the IPv6 address, also referred to as "prefix P1", which is characterized in that the first n bits therein are identical to the first n bits of P respectively. Here, the first n bits refer to the most important n bits of those composing a prefix, as usually expressed in the IPv6 address. In this regard, P1 can be called a child prefix of P.

P2/n+m1 is representative of a prefix, with a length of n+m1 (n and m1 are positive integers), in the IPv6 address, also referred to as "prefix P2", which is characterized in that the first n bits therein are identical to the first n bits of P respectively, and the $(n+1)^{th}$ to $(n+m1)^{th}$ bits therein are not identical to those in the prefix P1 respectively. In this sense, the prefixes P2 and P1 are different but of the same length. Obviously, P2 is also a child prefix of P.

P11/n+m1+m2 is representative of a prefix, with a length of n+m1+m2 (n, m1 and m2 are positive integers), in the IPv6 address, also referred to as "prefix P11", which is characterized in that the first n+m1 bits therein are identical to the first n+m1 bits of P1 respectively. P11 is a child prefix of P1.

P12/n+m1+m2 is such that the relationship between P12 and P11 is the same as that between P2 and P1, and the $(n+m1+1)^{th}$ to $(n+m1+m2)^{th}$ bits therein are not identical to those in the prefix P11 respectively. The prefixes P12 and P11 are also different but of the same length. P12 is also a child prefix of P1.

Analogously, a prefix P3 is of the same length as but different from P2 and P1, and is a child prefix of the prefix P; a prefix p13 is of the same length as but different from P11 and P12, and is a child prefix of the prefix P1, and so on.

With the above symbols, if a routing prefix is P/n, which is carried in a Router Advertisement message transmitted from the router R over the link connected directly with IF1, the layer-2 device SW1 extends the routing prefix passing therethrough. Here, prefixes for downlink ports of SW1 are respectively P1/n+m1, P2/n+m1, P3/n+m1, . . . , wherein the extended $(n+1)^{th}$ to $(n+m1)^{th}$ bits, the number of which is m1, are used by the device SW1 for assigning a different value to each downlink port. Thus, routing prefixes of ports connected with the hosts C and D are respectively P2 and P3. In the case that a link associated with the prefix P1 passes through the layer-2 device SW2, SW2 further extends the routing prefix to P11/n+m1+m2, P12/n+m1+m2, P13/n+m1+m2, . . . , wherein the extended $(n+m1+1)^{th}$ to $(n+m1+m2)^{th}$ bits, the number of which is m2, are used by the device SW2 for assigning a different value to each downlink port. Thus as the result of the routing prefix extensions, routing prefixes of ports connected with the hosts A and B become P11 and P12 respectively.

In this way, each time a routing prefix carried in a Router Advertisement message transmitted from the router passes through a layer-2 device, the routing prefix can be subject to a routing prefix extension performed by the layer-2 device receiving the Router Advertisement message, with the extended part being used by the layer-2 device for assigning a unique extended value to each downlink port.

Based upon the above arrangement of routing prefix extension and taking example for a link connected with the first interface IF1, a stateless autoconfiguration procedure according to an embodiment of the present invention will be described in detail as the following steps.

In step 1, the router transmits via the first interface IF1 to a link connected to that interface an RA message which carries routing prefix information, for example, P/n, for configuring a prefix for the link connected with IF1.

In step 2, the layer-2 device SW1 listens to the RA message from the uplink port, and upon reception of the RA message, generates a unique ID bit sequence for each downlink port (assuming, without limitation, that the number of the bits is m1) and appends the sequence after the received prefix P, so as to generate a plurality of extended prefixes P1/n+m1, P2/n+m1, P3/n+m1, . . .

In step 3, the layer-2 device SW1 transmits via each downlink port an RA message carrying a different prefix P1/n+m1, P2/n+m1, P3/n+m1, . . . , wherein the extended prefix information transmitted from each downlink port can identify that port uniquely within the broadcast domain of the subnet where the layer-2 device is located.

In step 4, if another layer-2 device (device SW2 in FIG. 3) is attached to the layer-2 device SW1, the attached layer-2 device repeats steps 2 and 3 for the prefix extension and the transmission operation.

In step 5, if a terminal device (a host in FIG. 3) is attached to the layer-2 device SW1, the terminal device receives the RA message, obtains the routing prefix information and appends its own interface ID information after the routing prefix information, so as to generate an IP address of the host.

While the preferred embodiments of the present invention have been described as above, the scope of the present invention shall not be limited thereto, and those skilled in the art can make various variations and modifications to the embodiments without departing from the scope of the present invention. All these variations and modifications would fall within the scope of the present invention as defined in the claims thereof.

What is claimed is:

1. A method for assigning an IP address to at least one terminal device connected to a router through a layer-2 device network, comprising:

transmitting, from the router to the layer-2 device network, a Router Advertisement message which carries routing prefix information comprising a routing prefix;

receiving, at the layer-2 device network, the Router Advertisement message via an uplink, wherein the layer-2 device network comprises a plurality of downlink ports;

extending, at the layer-2 device network, the routing prefix for each of the plurality of downlink ports of the layer-2 device network so as to generate a plurality of extended routing prefixes which identify respective downlink ports uniquely within the broadcast domain of the subnet where the layer-2 device network is located according to the routing prefix information in the received Router Advertisement message, each of the plurality of extended routing prefixes having a different extended part as well as the routing prefix in the Router Advertisement message; and transmitting, from the layer-2 device network to a terminal device corresponding to one of the plurality of downlink ports, a Router Advertisement message which carries extended routing prefix information comprising an extended routing prefix via the port corresponding to the terminal device; and generating, at the terminal device, an IP address of the terminal device according to the extended routing prefix information in the received Router Advertisement message and an interface ID of the terminal device.

2. A method according to claim 1, wherein the layer-2 device network comprises at least one layer-2 device connecting the router and the at least one terminal device.

3. A method according to claim 2, wherein the layer-2 device is any one selected from the group comprising an Ethernet switch, a digital subscriber loop access device and an asynchronous transfer mode switch.

4. A method according to claim 1, wherein said extending, at the layer-2 device network, the routing prefix for each of the plurality of downlink ports of the layer-2 device network so as to generate a plurality of extended routing prefixes which identify respective downlink ports uniquely within the broadcast domain of the subnet where the layer-2 device network is located comprises:

receiving, at a layer-2 device within the layer-2 device network, a Router Advertisement message transmitted from an upstream device, the layer-2 device comprising the uplink port;

extending for the downlink port of the layer-2 device the routing prefix to the extended routing prefix which identifies the downlink port uniquely within the broadcast domain of the subnet where the layer-2 device is located according to the routing prefix information carried in the received Router Advertisement message; and transmitting, via the downlink port corresponding to the terminal device, to a downstream device a Router Advertisement message carrying the extended routing prefix information which identifies the port.

5. A method according to claim 4, wherein the extended routing prefix comprises a bit sequence of the routing prefix information carried in the received Router Advertisement message and a bit sequence generated by the layer-2 device for the downlink port which identifies the downlink port uniquely within the broadcast domain of the subnet where the layer-2 device is located.

6. A method according to claim 5, wherein the layer-2 device is any one selected from the group comprising an Ethernet switch, a digital subscriber loop access device and an asynchronous transfer mode switch.

7. A method according to claim 4, wherein the layer-2 device is any one selected from the group comprising an Ethernet switch, a digital subscriber loop access device and an asynchronous transfer mode switch.

8. A communication system, comprising a router, a layer-2 device network, and at least one terminal device connected to the router through the layer-2 device network, wherein: the layer-2 device network comprises a first layer-2 device which comprises a first uplink port and a plurality of first downlink ports;

the router is configured to transmit to the layer-2 device network a Router Advertisement message which carries routing prefix information comprising a routing prefix;

the first layer-2 device is configured to receive the Router Advertisement message which carries the routing prefix information comprising the routing prefix via the first uplink port, extend for each of the plurality of first downlink ports the routing prefix to a first extended routing prefix which identifies the respective first downlink port uniquely within the broadcast domain of the subnet where the first layer-2 device is located according to the routing prefix information in the received Router Advertisement message, and transmit via each of the plurality of first downlink ports a Router Advertisement message carrying extended routing prefix information so as to transmit a Router Advertisement message which carries extended routing prefix information comprising an extended routing prefix for one of the plurality of first downlink ports to a terminal device corresponding to the one of the plurality of first downlink ports, wherein the extended routing prefix for the one of the plurality of first downlink ports has an extended part as well as the routing prefix; and the terminal device is configured to generate an IP address of the terminal device according to the extended routing prefix information in the received Router Advertisement message and an interface ID of the terminal device.

9. A communication system according to claim 8, wherein the first layer-2 device is any one selected from the group comprising an Ethernet switch, a digital subscriber loop access device and an asynchronous transfer mode switch.

10. The communication system according to claim 8, wherein the layer-2 device network further comprises a second layer-2 device comprising a second uplink port and a plurality of second downlink ports, wherein:

the second layer-2 device is configured to receive a Router Advertisement message which carries extended routing prefix information comprising a second extended routing prefix via the second uplink port, extend for each of the plurality of second downlink ports the second extended routing prefix to a plurality of third extended routing prefixes which identify a plurality of second downlink ports uniquely within the broadcast domain of the subnet where the second layer-2 device network is located according to the second routing prefix information, respectively, and transmit via each of the plurality of second downlink ports a Router Advertisement message which carries extended routing prefix information comprising one of the plurality of third extended routing prefixes.

11. The communication system according to claim 10, wherein the respectively different extended part is a unique ID bit sequence appended after the routing prefix.

12. A layer-2 device network connecting a router and at least one terminal device, comprising a first layer-2 device which comprises a first uplink port and a plurality of first downlink ports, and is attached to an interface of the router via the first uplink port to form a subnet, wherein the first layer-2 device is adapted to perform the following steps:

listening to a Router Advertisement message carrying routing prefix information from the first uplink port, the routing prefix information comprising a routing prefix;

extending the routing prefix to a plurality of first extended prefixes which identify respective first downlink ports of the layer-2 device uniquely within the broadcast domain of the subnet where the first layer-2 device is located, each of the plurality of first extended prefixes comprising a respective first extended part as well as the routing prefix; and transmitting, via each of the first downlink ports, a Router Advertisement message which carries extended routing prefix information comprising one of the plurality of first extended prefixes, respectively, such that the extended routing prefix information is capable to be used by a first terminal device attached to one of the plurality of first downlink ports to generate an IP address of the first terminal device.

13. The layer-2 device according to claim 12, wherein the respective first extended part is a unique ID bit sequence appended after the routing prefix.

14. The layer-2 device network according to claim 12 wherein the first layer-2 device is any one selected from the group comprising an Ethernet switch, a digital subscriber loop access device and an asynchronous transfer mode switch.

15. The layer-2 device network according to claim 12, comprising a second layer-2 device attached to a second downlink port of the first layer-2 device via an uplink port of the second layer-2 device, wherein the second layer-2 device is adapted to listen to a Router Advertisement message which carries extended routing prefix information comprising one of the plurality of first extended prefixes and extend the one of the plurality of first extended prefixes to a plurality of second extended prefixes identifying respective second downlink ports of the second layer-2 device uniquely within the broadcast domain of the subnet where the second layer-2 device is located, each of the plurality of second extended prefixes comprising the one of the plurality of first extended prefixes and a respective second extended part and transmit via each of downlink ports of the second layer-2 device a Router Advertisement message which carries extended routing prefix information comprising one of the plurality of second extended prefixes.

* * * * *